US010755434B2

(12) United States Patent
Mukherjee et al.

(10) Patent No.: US 10,755,434 B2
(45) Date of Patent: Aug. 25, 2020

(54) LOW FEATURE OBJECT DETECTION AND POSE ESTIMATION FOR IMAGE DATA STREAMS

(71) Applicant: SEIKO EPSON CORPORATION, Tokyo (JP)

(72) Inventors: Dibyendu Mukherjee, Scarborough (CA); Irina Kezele, Richmond Hill (CA); Mikhail Brusnitsyn, Toronto (CA)

(73) Assignee: SEIKO EPSON CORPORATION, Tokyo (JP)

( * ) Notice: Subject to any disclaimer, the term of this patent is extended or adjusted under 35 U.S.C. 154(b) by 230 days.

(21) Appl. No.: 15/938,914

(22) Filed: Mar. 28, 2018

(65) Prior Publication Data
US 2019/0304124 A1 Oct. 3, 2019

(51) Int. Cl.
G06T 7/73 (2017.01)
G06K 9/62 (2006.01)
G02B 27/01 (2006.01)
G06K 9/32 (2006.01)

(52) U.S. Cl.
CPC ............ G06T 7/73 (2017.01); G02B 27/0172 (2013.01); G06K 9/3233 (2013.01); G06K 9/6202 (2013.01); G02B 2027/0138 (2013.01)

(58) Field of Classification Search
CPC .... G06T 7/73; G02B 27/0172; G06K 9/3233; G06K 9/6202
See application file for complete search history.

(56) References Cited

U.S. PATENT DOCUMENTS 9,424,470 B1 8/2016 Hinterstoisser
2015/0235424 A1* 8/2015 Wang .................... G06T 19/006
345/633

OTHER PUBLICATIONS

Hodaň, Tomáš, et al. "Detection and fine 3D pose estimation of texture-less objects in RGB-D images." 2015 IEEE/RSJ International Conference on Intelligent Robots and Systems (IROS). IEEE, 2015. (Year: 2015).*
Cao, Zhe, Yaser Sheikh, and Natasha Kholgade Banerjee. "Real-time scalable 6DOF pose estimation for textureless objects." 2016 IEEE International conference on Robotics and Automation (ICRA). IEEE, 2016. (Year: 2016).*

(Continued)

Primary Examiner — Michelle M Entezari
Assistant Examiner — Raphael Schwartz
(74) Attorney, Agent, or Firm — Oliff PLC

(57) ABSTRACT

A method includes acquiring, from a camera, an image data sequence of a real object in a real scene and performing a first template-matching on an image frame in the image data sequence using intensity-related data sets stored in one or more memories to generate response maps. The intensity-related data sets represent an intensity distribution of a reference object from respective viewpoints. The reference object corresponds to the real object. A candidate region of interest is determined for the real object in the image frame based on the response maps, and second template-matching is performed on the candidate region of interest using shape-related feature data sets stored in one or more memories to derive a pose of the real object. The shape-related feature data sets represent edge information of the reference object from the respective viewpoints.

17 Claims, 6 Drawing Sheets

(56) References Cited

OTHER PUBLICATIONS

Hinterstoisser et al. "Gradient Response Maps for Real-Time Detection of Texture-Less Objects;" IEEE Transactions on Pattern Analysis and Machine Intelligence; pp. 1-14; May 2012; vol. 34, Issue 5.

* cited by examiner

LOW FEATURE OBJECT DETECTION AND POSE ESTIMATION FOR IMAGE DATA STREAMS

BACKGROUND

1. Technical Field

The disclosure relates generally to the field of object detection and pose estimation in image data streams, and more specifically to augmented reality system including low feature object detection and pose estimation in image data streams.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

Object tracking is important in many AR implementations. This means that a real-world object is "followed" by an artificial object, such as computer-graphics enhancements or an information bubble (as perceived by the user). In other words, if the real-world object moves or the user's view moves relative to the real-world object, the artificial object will remain in the same location relative to the real-world object and/or the content of the artificial object will be determined based on the movement and/or new location of the real-world object. Location tracking is also important in many AR implementations. This means that a virtual object will stay in one location in the scene, regardless of the movement of the user.

One platform for implementing AR is the smartphone. The presence of a camera, display device, and processor on the same device allows for software to easily add artificial elements to a live scene captured by the camera. Moreover, the presence of motion sensors and locators (e.g. accelerometers and GPS) on these devices is exploited by the software to better implement AR.

Although smartphones provide a simple and convenient platform for implementing AR, they do not provide a very immersive experience for the user. This is because the user's eyes are spatially separated from the smartphone, and instead of perceiving the environment with their own eyes, they are viewing the scene as captured by the camera.

To improve on the AR experience, the transparent head-mounted display (HMD) can implement AR. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

3D pose estimation is an important technology with many applications, including the fields of AR, VR and robotics. In AR and VR, the problem is that of tracking the 3D pose of the object with respect to the camera so that various augmented or virtual reality elements can be anchored to the object. Many trackers require an initialization method to first start tracking and to re-start tracking in case of tracking loss. This requires estimating the pose of an object from an image without prior history, a technology sometimes referred to as object detection and pose estimation (ODPE).

SUMMARY

For rich feature objects, a common approach is to establish sparse point correspondences between features on a 3D model and features in the image and solve the Perspective-n-Point (PnP) problem. These correspondences are typically established by detecting stable keypoints and matching them using distinctive appearance-based descriptors, such as Oriented FAST and Rotated BRIEF (ORB) descriptors.

However, for low feature objects, e.g., objects without many or distinct features, detecting stable keypoints and computing distinctive appearance based descriptors is challenging. Thus, in some known systems, low feature object detection and pose estimation (LFODPE) produces a large number of false detections, particularly in regions with uniform intensity and regions with intensity variations similar to the object to be detected.

Embodiments of the present application disclose systems with a camera, a display device, and a processor. The example embodiments may increase accuracy of object detection in image data streams captured by the camera and may improve accuracy of displayable items on the display. More particularly, the example embodiments may increase the accuracy of object detection and pose estimation for low feature objects.

An advantage of some aspects of the disclosure is to solve at least a part of the problems described above, and aspects of the disclosure can be implemented as the following aspects.

One aspect of the disclosure is a non-transitory computer readable medium that embodies instructions that cause one or more processors to perform a method. The method includes (A) acquiring, from a camera, an image data sequence of a real object in a real scene and (B) performing a first template-matching on an image frame in the image data sequence using intensity-related data sets stored in one or more memories to generate response maps. The intensity-related data sets represent an intensity distribution of a reference object from respective viewpoints, and the reference object corresponds to the real object. The method includes (C) determining a candidate region of interest for the real object in the image frame based on the response maps, and (D) performing a second template-matching on the candidate region of interest using shape-related feature data sets stored in one or more memories to derive a pose of the real object. The shape-related feature data sets represent edge information of the reference object from the respective viewpoints.

Another aspect of the present disclosure is a method including acquiring, from a camera, an image data sequence of a real object in a real scene and performing a first template-matching on an image frame in the image data sequence using intensity-related data sets stored in one or more memories to generate response maps. The intensity-related data sets represent an intensity distribution of a reference object from respective viewpoints. The reference object corresponds to the real object. A candidate region of interest is determined for the real object in the image frame based on the response maps, and second template-matching is performed on the candidate region of interest using shape-related feature data sets stored in one or more memories to derive a pose of the real object. The shape-related feature data sets represent edge information of the reference object from the respective viewpoints.

According to another aspect of this disclosure a head-mounted display device includes a camera, one or more memories, a display device, and a processor configured by instructions stored in the one or more memories to perform a method. The method includes (A) acquiring, from the camera, an image data sequence of a real object in a real scene, and (B) performing a first template-matching on an image frame in the image data sequence using intensity-related data sets stored in the one or more memories to generate response maps. The intensity-related data sets represent an intensity distribution of a reference object from respective viewpoints, and the reference object corresponds to the real object. The method includes (C) determining a candidate region of interest for the real object in the image frame based on the response maps, and (D) performing a second template-matching on the candidate region of interest using shape-related feature data sets stored in the one or more memories to derive a pose of the real object. The shape-related feature data sets represent edge information of the reference object from the respective viewpoints. The method also includes (E) displaying, with the display device, a display image. At least one of the position at which the display image is displayed and the content of the display image is based at least in part on the derived pose of the object.

BRIEF DESCRIPTION OF THE DRAWINGS

The disclosure will be described with reference to the accompanying drawings, wherein like numbers reference like elements.

DESCRIPTION OF EXEMPLARY
EMBODIMENTS

Figure 1:
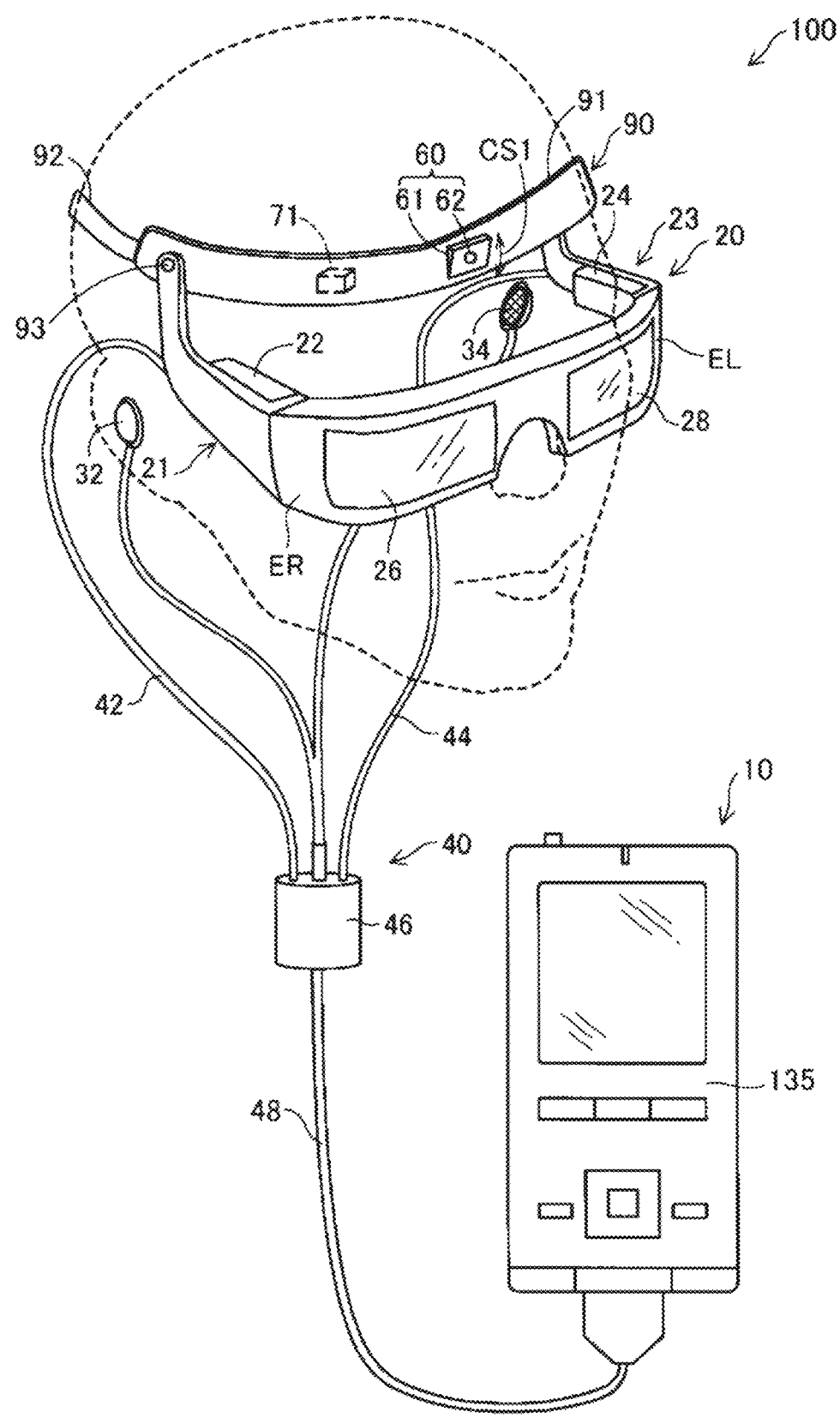
FIG. 1 is a diagram illustrating a schematic configuration of an example HMD.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable. In some other embodiments, the camera 60 and IMU 71 may be provided in the display section 20, so that they are fixed with respect to the display section 20. The spatial relationships represented by the rotation and translation matrices among the camera 60, IMU 70 and display section 20, which have been obtained by calibration, are stored in a memory area or device in the control section 10.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
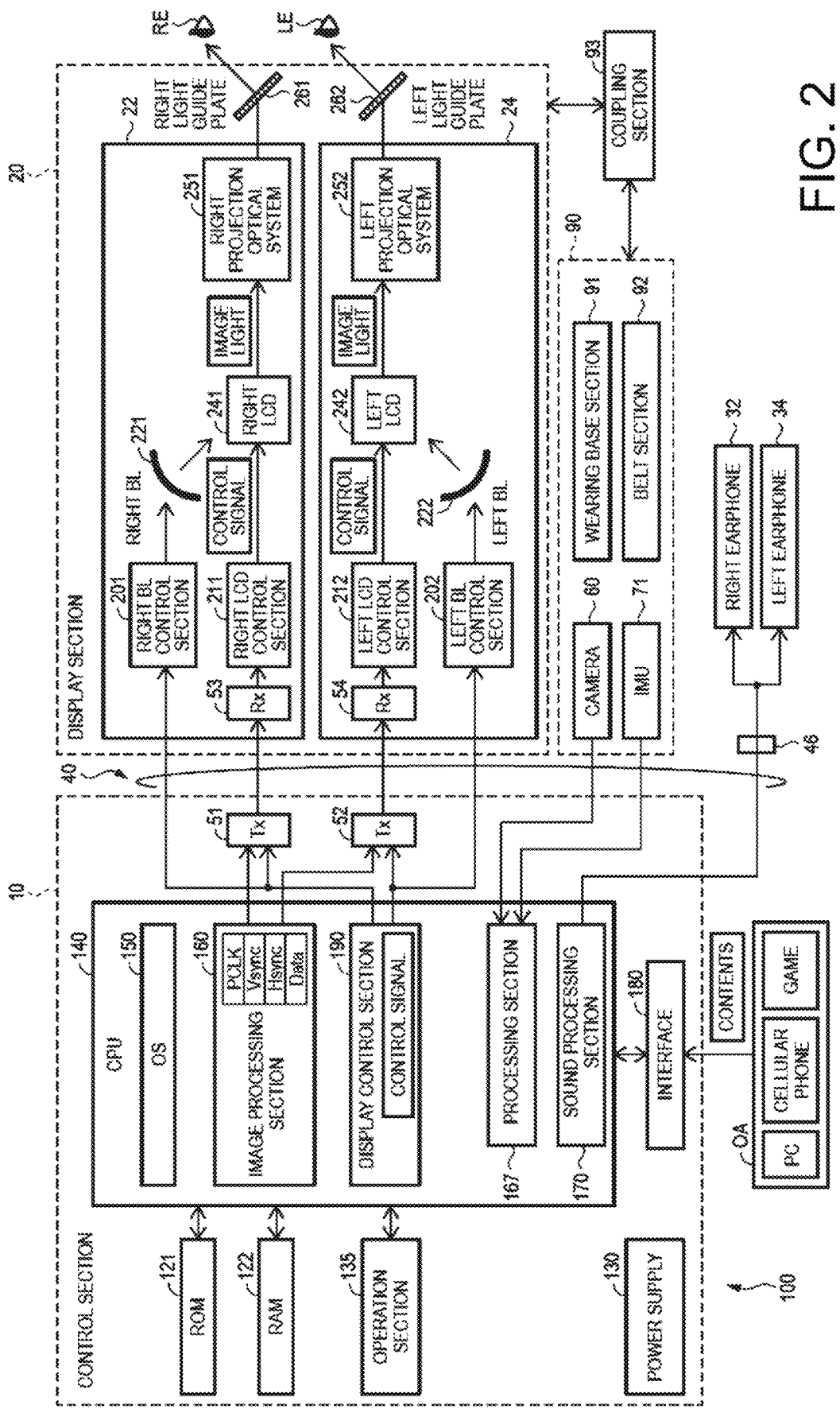
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitter 51 (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops or loads, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a homography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The device to which the technology disclosed as an embodiment is applied may be an imaging device other than an HMD. For example, the device may be an imaging device that has no function of displaying an image.

Figure 3:
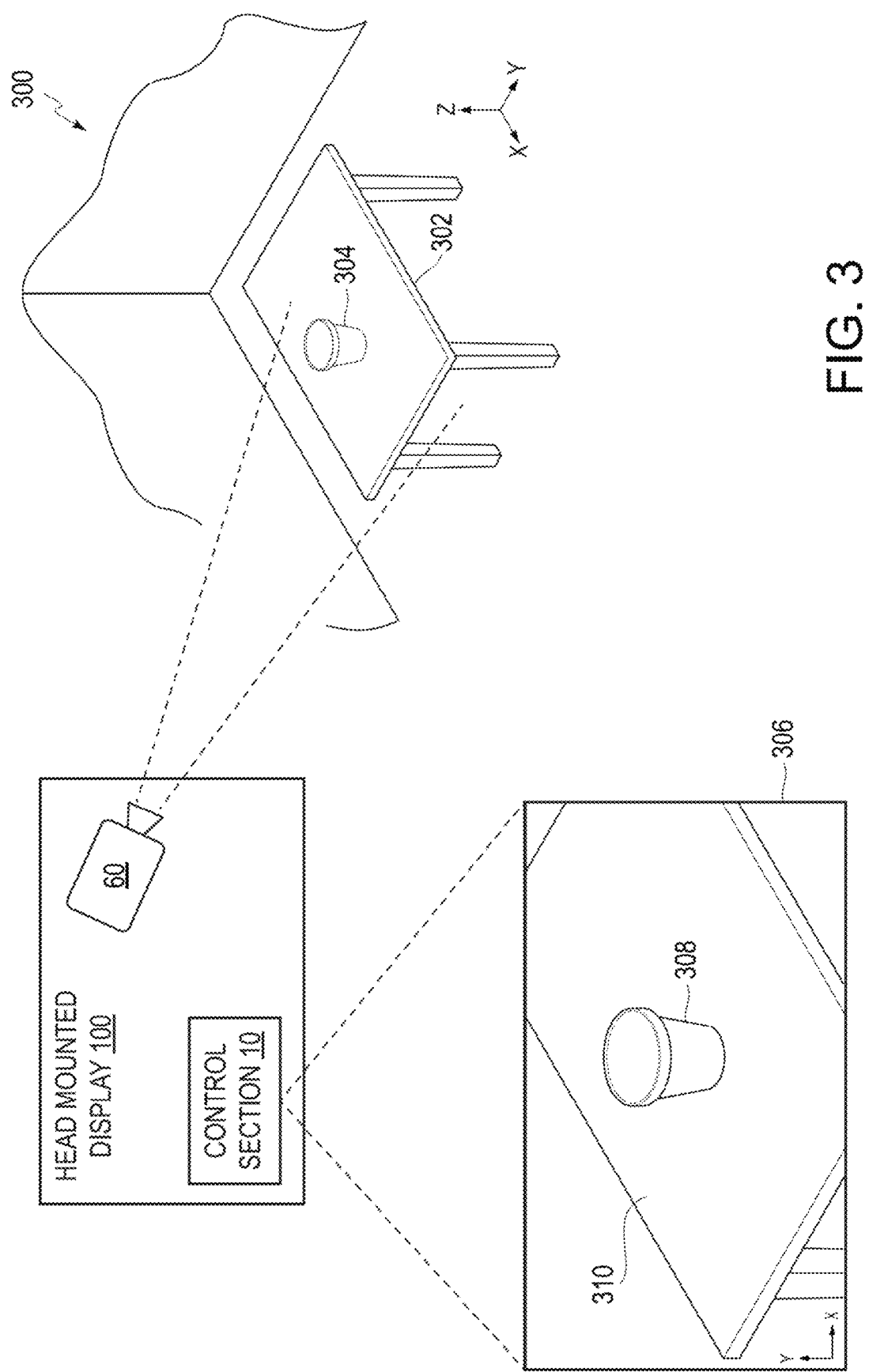
FIG. 3 is a diagram illustrating use of the HMD shown in FIGS. 1 and 2 in a three dimensional (3D) real-world scene.

FIG. 3 is a diagram illustrating use of the HMD 100 in a three dimensional (3D) real-world scene 300. Scene 300 includes a table 302 and an object 304 on the table 302. A user (not shown) wearing HMD 100 is positioned to view the scene 300. The camera 60 of the HMD 100 also views the scene 300 from approximately the same viewpoint as the user. The camera 60 captures images of the scene 300 from the viewpoint and provides an image data stream to the control section 10. The image data stream includes multiple temporally separate two dimensional (2D) image frames. FIG. 3 includes an example image frame 306, sometimes referred to as an image, received by the control section 10. The image frame 306 includes a representation 308 of the object 304 as viewed from the camera's viewpoint and a representation 310 of a portion of the table 302. A representation of an object, such as the representation 308 of object 304, in an image frame is sometimes also referred to herein as the object in the image frame.

As will be explained in more detail herein, the control section 10 initially attempts to locate the representation 310 of the object 304 in the image frame 306 and determine its pose. The control section 10 then attempts to track the representation 310 of the object 304 and update the pose of the object through subsequent image frames.

For initial detection of rich feature objects, some known systems establish sparse point correspondences between features on a 3D model of the object and features in the image and solve the PnP problem based on the established correspondences. These correspondences are typically established by detecting stable keypoints and matching them using distinctive appearance-based descriptors, such as ORB descriptors. However, for low feature objects and objects in cluttered environments detecting stable keypoints and computing distinctive appearance based descriptors may be challenging.

Accordingly, some embodiments of the present disclosure take a different approach to detection. Generally, and as described in more detail below, the approach, performed by the control section 10, is based on template-matching based on intensity-related data sets followed by template-matching based on shape-related data sets.

To perform the method described hereinafter, intensity-related data sets and shape-related data sets corresponding to the real object to be detected and/or tracked are needed. Various suitable techniques for template creation for objected detection and pose estimation are known in the art and will not be described in detail herein. Generally, the intensity-related data sets and the shape-related data sets are data-sets that represent a reference object from a plurality of viewpoints. The reference object may be a digital 3D model of the real object, a real-world version of the real object, or any other suitable representation of the real object. Images of the reference object are captured (in the case of a real-world version of the object) or projected (in the case of a 3d model of the object) from various viewpoints around the reference object. For the intensity-related data sets, the RGB data for each pixel of each image of the reference object is converted into an intensity data point. For the shape-related data sets, the shape of the reference object in each image of the reference object, for example the edges of the reference object, are detected and stored as a shape-related data set. In other embodiments, any other suitable method for generating intensity-related data sets or shape-based data sets may be used. Moreover, although edge-based templates are described for use as the shape-related data sets, in other embodiments, any other shape-based templates may be used.

Figure 4:
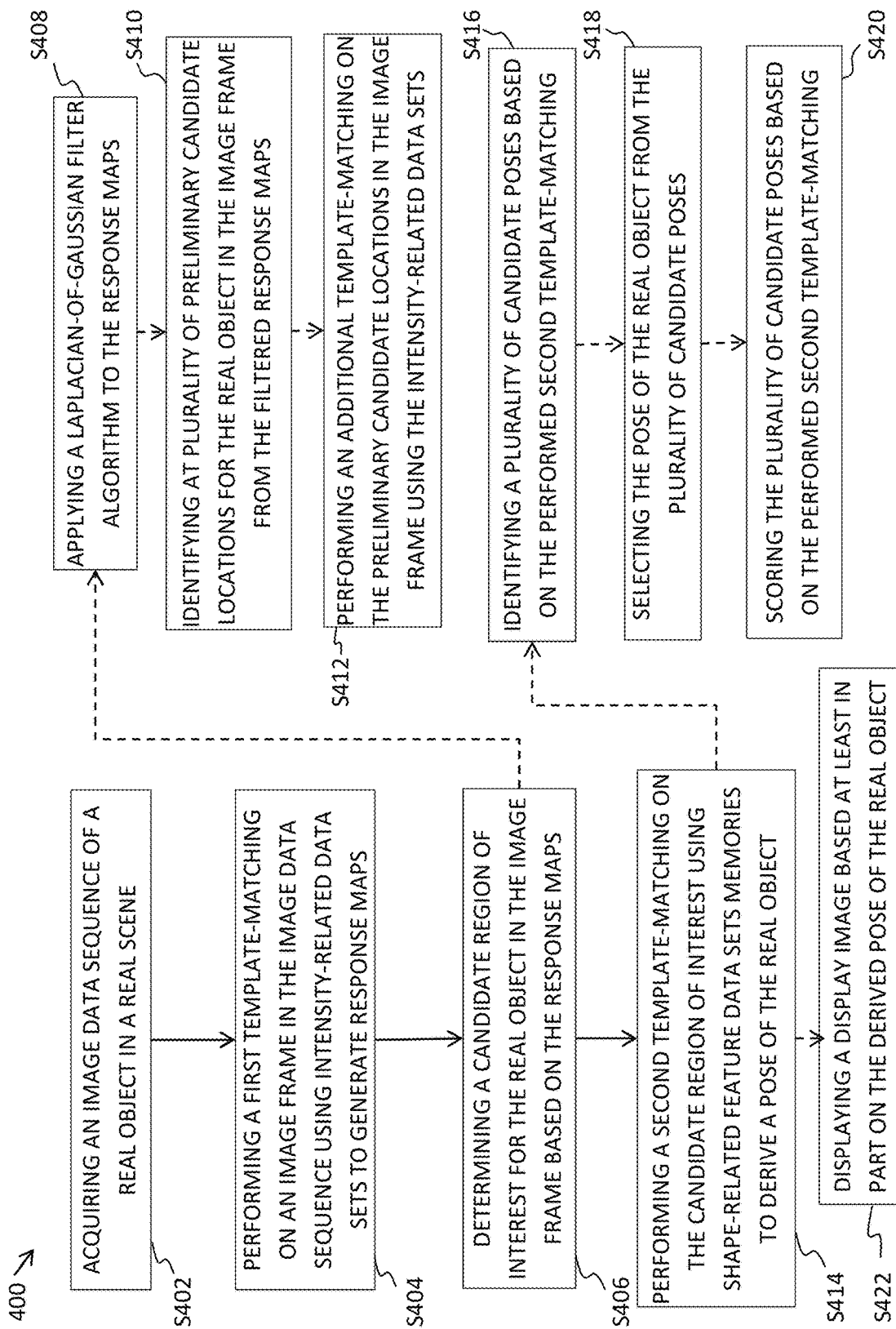
FIG. 4 a flow diagram of an example method of object detection and pose estimation.

FIG. 4 is a flow diagram of an example embodiment of a method 400 of detection of a representation of an object in an image frame. In the diagram of FIG. 4, solid lines represent a connection of steps in the example embodiment being described, and dashed lines connect steps that are optional or included in upstream steps such as steps S406 and S414 in alternative embodiments. Additionally, the method will be described with respect to the HMD 100 and its components. However, the method 400 may be used with any suitable device for object detection and pose estimation, including, for example, a cell phone, a computer connected to a camera, and the like.

Figure 5:
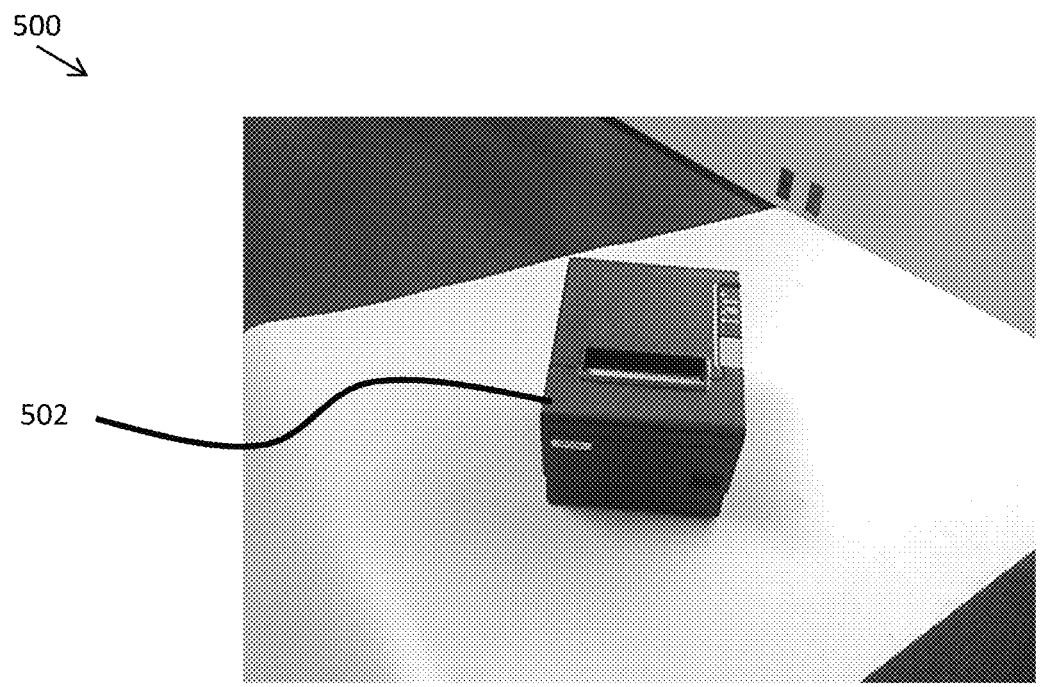
FIG. 5 is an example image frame acquired as part of the method of FIG. 4.

At S402, the method includes acquiring, from a camera (such as the camera 60), an image data sequence of a real object in a real scene. FIG. 5 is an example of an image frame 500 from an image data sequence acquired from the camera 60 of an object 502 (which is a real object in a real scene). In an example embodiment, the image frame 500 has an original resolution of 640 pixels by 480 pixels. In other embodiments, the image frame 500 may have any other suitable resolution.

A first template-matching on the image frame 500 in the image data sequence is performed in S404 using intensity-related data sets stored in one or more memories, such as ROM 121 or RAM 122, to generate response maps. As noted above, the intensity-related data sets represent an intensity distribution of a reference object from respective viewpoints, where the reference object corresponds to the real object. The intensity distribution of the reference object from each viewpoint may be sometimes referred to as a template, with the templates for all of the respective viewpoints making up the intensity-related data sets.

Figure 6:
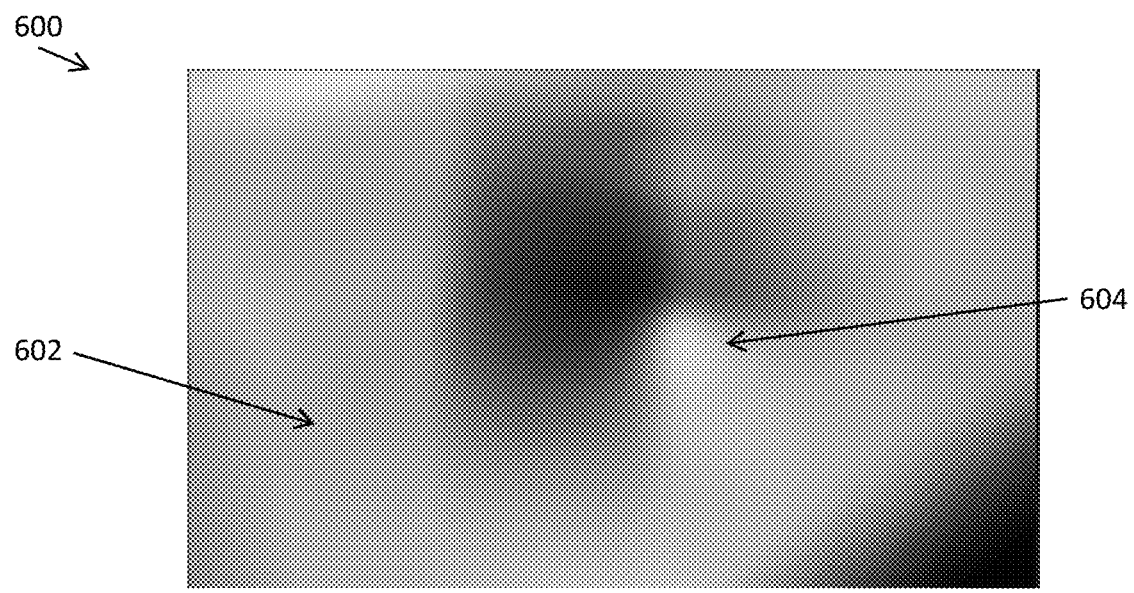
FIG. 6 is a response map produced from the image frame of FIG. 5 during performance of the method of FIG. 4.

For the template-matching based on the intensity-related data sets, cross-correlation of each template with all pixels of the image frame 500 is performed. More particularly, the template is located in a first position on the image frame 500, and the intensity data for each pixel in the template is compared to the pixel in the image frame at the same location. The template is then shifted, for example by one pixel in one dimension, and the intensity of each of the template's pixels is compared to the corresponding pixels in the image frame 500 at the new location. This process continues until the template has been compared to the image frame 500 at every position of the template on the image frame 500. In other embodiments, the template may be compared to fewer than all possible positions on the image frame, for example, by moving the template by two pixels after each comparison. After the comparison of one template to the image frame 500 at all (or the selected number of) locations is completed, a response map is generated for the first template and the process is repeated for the template corresponding to the next viewpoint. The process continues until all templates have been compared to the image frame and there is a response map for each template. FIG. 6 is an example of one such response map 600 produced for the image frame 500.

To increase the speed of performance and/or to reduce the computational load, the intensity-based first template-matching is performed at on a relatively low resolution version of the image frame 500. In the example embodiment, this first resolution is 80 pixels by 60 pixels, although other embodiments may use any other suitable resolution, including the original resolution of the image frame 500. In some embodiments, an image pyramid is created from the image frame 500. The image pyramid includes multiple different resolution versions of the image frame. The original image frame is the highest resolution image frame in the image pyramid and each of the created image frames has a lower resolution than the original image frame. In the example embodiment, the lowest resolution image frame is used for the first template-matching. Alternatively, any other image frame in the pyramid may be used for template matching. The specific resolutions of the image frames in the pyramid may be selected at any appropriate resolutions. In an example embodiment, the lowest resolution image frame has a resolution of about 80 by 60 pixels.

The calculations to determine the similarity of the image frame 500 to each of the intensity-based templates may be performed using any suitable cross-correlation technique. One suitable technique for matching the template to the image frame produces a response map using a normalized cross correlation with no mean subtraction by:

$$R(x, y) = \frac{\sum_{x',y'} T(x', y')I(x+x', y+y')}{\sqrt{\sum_{x',y'} T(x', y')^2 \sum_{x',y'} I(x+x', y+y')^2}} \quad (1)$$

In other embodiment, any other suitable cross-correlation technique may be used to produce a response map.

In S406, a candidate region of interest for the real object in the image frame based on the response maps. In the response map 600 of FIG. 6, the brighter spots represent closer correlation between the template and the image frame 500. As can be seen, the response map 600 includes a large number of positions with relatively high correlation to the intensity-based template, each of which could be a candidate location for the location of the object in the image frame 500. In some embodiments, the method proceeds from this point to S408 (discussed below), with each of the preliminary candidate locations being a candidate region of interest.

As can be seen by comparison of the response map 600 in FIG. 6 with the image frame 500 in FIG. 5, a large number of the brighter areas of the response map 600 do not actually correspond to the location of the object 502. There are many reasons for such numerous incorrect locations. For example, because low-feature objects lack texture information and often contain gradual intensity variation or uniform intensity distribution, high cross-correlation scores often occur when correlated to backgrounds with uniform intensity.

Some embodiments reduce the number of candidate locations by applying a Laplacian-of-Gaussian (LoG) filter algorithm to the response maps to determine and store, in one or more memories, the candidate region of interest. In the response map 600, the response to a uniform background is generally a large patch with high cross-correlation scores, such as the area 602 in FIG. 6. The response to small objects with a similar intensity distribution is a small blob-like patch, such as the area 604. These blob-like patches are generally bulb shaped with the highest cross-correlation scores in the center of the bulb and a gradually decreasing score as the distance from the center increases to the edge of the patch. LoG filters are effective at detecting "blob-like" structures in images and ignoring large patches and uniform structures. Thus, by applying a LoG filter to the response map 600, the areas in which the template has a high cross-correlation score to the uniform background are dropped and the areas with localized high cross-correlation scores remain.

Figure 7:
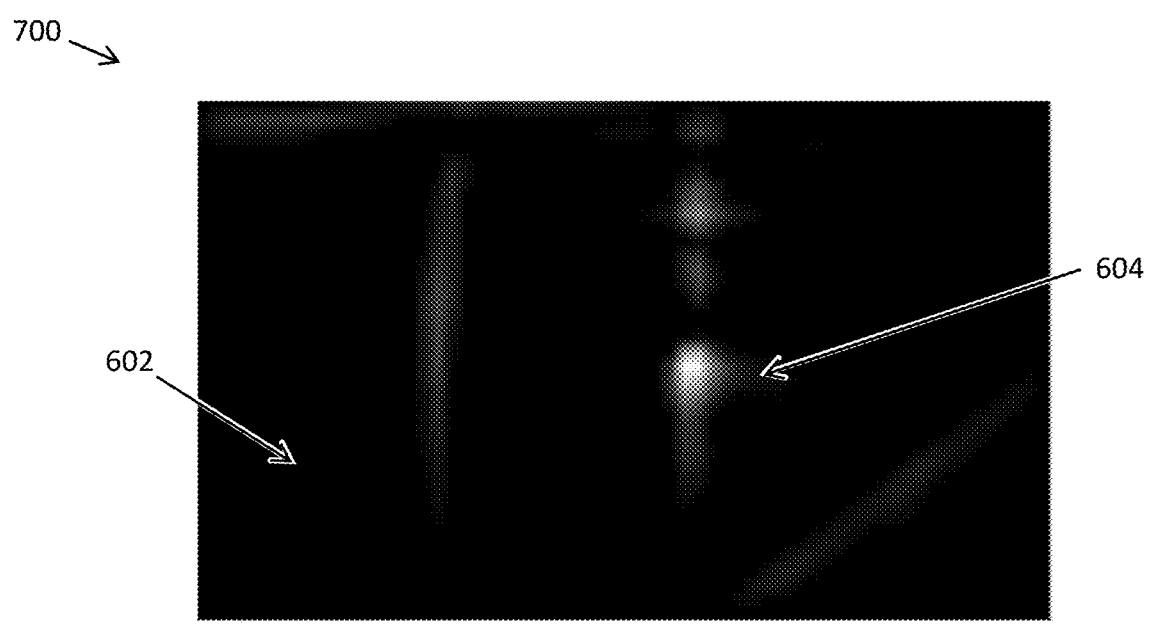
FIG. 7 is a filtered response map produced from the response map of FIG. 6.

FIG. 7 shows a filtered response map 700 that results from application of a LoG filter to the response map 600. As is evident, many of the areas in which the template produced a relatively high cross-correlation with the uniform background, such as the area 602 in FIG. 6, have dropped out in the filtered response map 700, while areas of more localized high cross-correlation score, such as the area 604 in FIG. 6, are retained. Thus, fewer candidate locations for detection of the object 502 remain.

In some embodiments, the number of candidate locations is further reduced by performing one or more additional steps. One step is to sort the candidate locations by similarity score and apply a minimum threshold requirement. Thus, the locations with similarity scores below the threshold are dropped and only the candidate locations that meet or exceed the threshold remain. The threshold is generally conservatively selected to ensure that the correct candidate location remains, even if that results in some incorrect candidate locations also remaining. Moreover, the thresholding may be applied to all of the locations on all of the response maps. This step may also serve to limit the number of candidate poses, as templates for poses that are significantly different than the pose of the real object may not have any locations that exceed the threshold. In other embodiments, the threshold is a relative threshold set for each template separately, such that every template will remain and include only its closest matches.

One suitable technique for applying a threshold to the filtered response map is to determine global maximum and the local maxima of the response map for each template. All local maxima locations $(x_i, y_i)$ that have a correlation with the template exceeding a threshold value and that are within a predetermined percentage of the global maximum are selected as candidate locations. In an example embodiment, local maxima that exceed a correlation score of 0.7 and are within 70% of the global maxima are selected as initial candidate locations. If there are less than K initial candidate locations, all initial candidate locations are selected as the candidate locations. If there are more than K initial candidate locations, only the top K initial candidate locations are selected as the candidate locations. In an example embodiment, K is twenty. In other embodiments, K may be any other suitable number of candidate locations. In other embodiments, any other suitable method for applying a relative or absolute threshold may be used.

In S410, the remaining candidate locations are identified from the filtered response map 700 (whether with or without the thresholding step) as a plurality of preliminary candidate locations. Generally, for each of the remaining regions with a high similarity score, the center of the regions is selected as a preliminary candidate location.

As noted above, the intensity-based first template-matching was performed on a low resolution version of the original image frame. However, at low resolutions, intensity templates do not have very many texture details or intensity variations and generally, are not very discriminative. Hence, for multi-view object detection, the highest cross-correlation scores may belong to training templates that are at a physically different pose from the object 502. Thus, the location of the real object may be one of the locations identified by the preliminary candidate locations, the pose of the real object may be significantly different from the poses suggested by the first template-matching.

In the example embodiment, the method may continue to S412, in which an additional template-matching using the intensity-based data sets is performed on the preliminary candidate locations to determine the candidate region of interest. The same template-matching as described above is performed again, but only on the preliminary candidate locations (rather than at every pixel of the entire image frame 500). In the example embodiment, this additional template-matching is performed on a copy of the image frame 500 having a second resolution greater than the first resolution. In an example embodiment, the second resolution is 320 pixels by 240 pixels. In other embodiments, any suitable resolution greater than the first resolution, including the original resolution of the image frame 500, may be used. Because the template-matching is performed on fewer locations in S412 than during S404 the use of a higher resolution copy of the image frame 500 does not significantly slow down the method.

The second intensity-based template matching is more discriminative and provides a guard against obvious wrong pose candidates. The resulting cross-correlation scores are used again to rank the preliminary candidate locations from all of the response maps, which may be subjected to thresholding to drop the least likely candidate locations. This results in a list of candidate locations and rough poses for the next step of the method. It should be noted, that because the method is performed for each template with its respective view, this process produces not just the likely location of the object 502, but its likely approximate pose. The locations within the image frame 500 with the highest similarity scores after performing the above steps correspond to the most likely locations for the object 500, and the templates with the highest scores, generally in the same areas, represent the most likely pose of the object 502 in the image frame 500.

Intensity-based template matching is somewhat prone to wrong matches due to illumination variations, reflections, contrast variations, and the like and may not be discriminative enough. The steps of the method described above improve results, but may not completely overcome all of the difficulties associated with intensity-based template-matching. Shape-based template matching is very suitable for low-feature objects and has proven to be very effective in ODPE. However, shape matching is typically very slow to perform on a full image frame, and real-time execution even over a limited range of views is computationally very intensive.

To further refine the location and pose of the object, in S414, a second template-matching on each candidate region of interest is performed. The second template-matching, however, uses shape-related feature data sets stored in one or more memories to derive a pose of the real object. The shape-related feature data sets represent edge information of the reference object from the respective viewpoints.

The second template-matching is location and pose constrained by the results of the earlier steps. The second template matching is only performed on the selected candidate regions of interest from S406 and only using the poses from the templates that produced the selected candidate regions of interest. Thus, the shape based-template matching may be performed relatively quickly and without significant computational burden.

Any suitable shape-based or edge-based template-matching technique may be used. One suitable technique for the second template-matching is based on gradients (typically found along the contour of an object in an image) and uses the equation:

$$\varepsilon(I,T,c) = \Sigma_{r \in P} |\cos(ori(O,r) - ori(I,c+r))| \qquad (2)$$

In equation 2, ori(O, r) is the gradient orientation in radians at location r in a reference image O of the object to be detected (i.e., in the template). In equation 2, ori(I, c+r) is the gradient orientation at c shifted by r in the image frame being analyzed. P defines a list of locations to be considered in O, and a template T is defined as a pair t=(O, P). Each template T is created by extracting a set of discriminant gradient orientations from its reference image and storing their locations. The discriminant gradients are selected based on the strength of the norms of the gradients.

In some embodiment, S414 includes identifying a plurality of candidate poses based on the performed second template matching at S416. The plurality of candidate poses may be identified by selecting those poses that have the highest similarity scores after the second template-matching in S420 and selecting the candidate pose with highest score as the pose of the real object in S418.

In other embodiments, the plurality of candidate poses are used for additional fine edge refinement and fine pose verification before selecting the pose of the real object as the pose that has the highest score after the additional fine edge refinement and fine pose verification. In an example embodiment, in S416, only the top six candidate poses are kept and are subject to the additional fine edge refinement and fine pose verification before selecting the pose of the real object from the six candidate poses. In other embodiments, more or fewer candidate poses may be retained.

Once a pose of the real object is determined, in some embodiments, the method includes S422 displaying, on a display device such as right optical-image display 26 and/or left optical-image display 28, a display image. At least one of the position at which the display image is displayed and the content of the display image is based at least in part on the derived pose of the real object of the object. That is, what is displayed or where it is displayed is determined by the derived pose of the real object.

Some embodiments provide a non-transitory storage medium (e.g. ROM 121, RAM 122) containing program instructions that, when executed by a computer processor (e.g. CPU 140 or processing section 167), perform the methods described herein.

Although the invention has been described with reference to embodiments herein, those embodiments do not limit the scope of the invention. Modifications to those embodiments or different embodiments may fall within the scope of the invention.

What is claimed is:

1. A non-transitory computer readable medium that embodies instructions that cause one or more processors to perform a method comprising:
    (A) acquiring, from a camera, an image data sequence of a real object in a real scene,
    (B) performing a first template-matching on an image frame in the image data sequence using intensity-related data sets stored in one or more memories to generate response maps, wherein the intensity-related data sets represent an intensity distribution of a reference object from respective viewpoints, the reference object corresponding to the real object,
    (C) determining a candidate region of interest for the real object in the image frame based on the response maps, wherein the determining the candidate region of interest includes applying a Laplacian-of-Gaussian filter algorithm to the response maps to determine and store, in one or more memories, the candidate region of interest, and
    (D) performing a second template-matching on the candidate region of interest using shape-related feature data sets stored in one or more memories to derive a pose of the real object, wherein the shape-related feature data sets represent edge information of the reference object from the respective viewpoints.

2. The non-transitory computer readable medium according to claim 1, wherein (C) further comprises:
    identifying a plurality of preliminary candidate locations for the real object in the image frame from the response maps to which the Laplacian-of-Gaussian filter algorithm has been applied, and
    performing an additional template-matching on the preliminary candidate locations in the image frame using the intensity-related data sets to determine the candidate region of interest.

3. The non-transitory computer readable medium according to claim 2, wherein the first template-matching is performed using a first copy of the image frame at a first resolution and the additional template-matching is performed using a second copy of the image frame at a second resolution, the second resolution being a higher resolution than the first resolution.

4. The non-transitory computer readable medium according to claim 1, wherein (D) further comprises:
    identifying a plurality of candidate poses based on the performed second template-matching, and
    selecting the pose of the real object from the plurality of candidate poses.

5. The non-transitory computer readable medium according to claim 4, wherein (D) further comprises
    scoring the plurality of candidate poses based on the performed second template-matching, and
    wherein selecting the pose of the real object from the plurality of candidate poses comprises selecting the candidate pose having the highest score as the pose of the real object.

6. The non-transitory computer readable medium according to claim 1, further comprising:
    (E) displaying, with a display device, a display image, at least one of the position at which the display image is displayed and the content of the display image being based at least in part on the derived pose of the real object.

7. A method comprising:
    (A) acquiring, from a camera, an image data sequence of a real object in a real scene,
    (B) performing a first template-matching on an image frame in the image data sequence using intensity-related data sets stored in one or more memories to generate response maps, wherein the intensity-related data sets represent an intensity distribution of a reference object from respective viewpoints, the reference object corresponding to the real object,
    (C) determining a candidate region of interest for the real object in the image frame based on the response maps, wherein the determining the candidate region of interest includes applying a Laplacian-of-Gaussian filter algorithm to the response maps to determine and store, in one or more memories, the candidate region of interest, and
    (D) performing a second template-matching on the candidate region of interest using shape-related feature data sets stored in one or more memories to derive a pose of the real object, wherein the shape-related feature data sets represent edge information of the reference object from the respective viewpoints.

8. The method according to claim 7, wherein (C) further comprises:
    identifying a plurality of preliminary candidate locations for the real object in the image frame from the response maps to which the Laplacian-of-Gaussian filter algorithm has been applied, and
    performing an additional template-matching on the preliminary candidate locations in the image frame using the intensity-related data sets to determine the candidate region of interest.

9. The method according to claim 8, wherein the first template-matching is performed using a first copy of the image frame at a first resolution and the additional template-matching is performed using a second copy of the image frame at a second resolution, the second resolution being a higher resolution than the first resolution.

10. The method according to claim 7, wherein (D) further comprises:
    identifying a plurality of candidate poses based on the performed second template-matching, and
    selecting the pose of the real object from the plurality of candidate poses.

11. The method according to claim 10, wherein (D) further comprises
    scoring the plurality of candidate poses based on the performed second template-matching, and
    wherein selecting the pose of the real object from the plurality of candidate poses comprises selecting the candidate pose having the highest score as the pose of the real object.

12. The method according to claim 7, further comprising:
    (E) displaying, with a display device, a display image, at least one of the position at which the display image is displayed and the content of the display image being based at least in part on the derived pose of the real object.

13. A head-mounted display comprising:
a camera;
one or more memories;
a display; and
a processor configured by instructions stored in the one or more memories to perform a method comprising:
  (A) acquiring, from the camera, an image data sequence of a real object in a real scene,
  (B) performing a first template-matching on an image frame in the image data sequence using intensity-related data sets stored in the one or more memories to generate response maps, wherein the intensity-related data sets represent an intensity distribution of a reference object from respective viewpoints, the reference object corresponding to the real object,
  (C) determining a candidate region of interest for the real object in the image frame based on the response maps, wherein the determining the candidate region of interest includes applying a Laplacian-of-Gaussian filter algorithm to the response maps to determine and store, in the one or more memories, the candidate region of interest,
  (D) performing a second template-matching on the candidate region of interest using shape-related feature data sets stored in the one or more memories to derive a pose of the real object, wherein the shape-related feature data sets represent edge information of the reference object from the respective viewpoints, and
  (E) displaying, with the display, a display image, at least one of the position at which the display image is displayed and the content of the display image being based at least in part on the derived pose of the object.

14. The head-mounted display according to claim 13, wherein (C) further comprises:
  identifying a plurality of preliminary candidate locations for the real object in the image frame from the response maps to which the Laplacian-of-Gaussian filter algorithm has been applied, and
  performing an additional template-matching on the preliminary candidate locations in the image frame using the intensity-related data sets to determine the candidate region of interest.

15. The head-mounted display according to claim 14, wherein the first template-matching is performed using a first copy of the image frame at a first resolution and the additional template-matching is performed using a second copy of the image frame at a second resolution, the second resolution being a higher resolution than the first resolution.

16. The head-mounted display according to claim 13, wherein (D) further comprises:
  identifying a plurality of candidate poses based on the performed second template-matching, and
  selecting the pose of the real object from the plurality of candidate poses.

17. The head-mounted display according to claim 16, wherein (D) further comprises
  scoring the plurality of candidate poses based on the performed second template-matching, and
  wherein selecting the pose of the real object from the plurality of candidate poses comprises selecting the candidate pose having the highest score as the pose of the real object.

* * * * *